United States Patent
Furlong

(10) Patent No.: US 6,759,843 B2
(45) Date of Patent: Jul. 6, 2004

(54) SENSING METHODS AND SYSTEMS FOR HALL AND/OR MR SENSORS

(75) Inventor: Gregory R. Furlong, Freeport, IL (US)

(73) Assignee: Honeywell International Inc., Morristown, NJ (US)

(*) Notice: Subject to any disclaimer, the term of this patent is extended or adjusted under 35 U.S.C. 154(b) by 57 days.

(21) Appl. No.: 10/295,746

(22) Filed: Nov. 15, 2002

(65) Prior Publication Data

US 2004/0095129 A1 May 20, 2004

(51) Int. Cl.[7] ................................................ G01B 7/30
(52) U.S. Cl. ............................ 324/207.2; 324/207.21; 324/207.25; 327/511
(58) Field of Search ................ 324/207.12, 207.2, 324/207.21, 207.24, 207.25, 207.26, 251, 252; 338/32 R, 32 H; 327/510, 511

(56) References Cited

U.S. PATENT DOCUMENTS

| | | | |
|---|---|---|---|
| 4,107,603 A | * 8/1978 | Slough | 324/207.25 |
| 5,291,133 A | * 3/1994 | Gokhale et al. | 324/207.25 |
| 5,497,084 A | * 3/1996 | Bicking | 324/207.25 |
| 5,497,111 A | 3/1996 | Cunningham | 327/58 |
| 5,559,460 A | 9/1996 | Cunningham | 327/179 |
| 5,736,852 A | * 4/1998 | Pattantyus | 324/166 |
| 5,969,545 A | 10/1999 | Assadian et al. | 327/62 |
| 6,160,395 A | 12/2000 | Goetz et al. | 324/207.21 |
| 6,191,576 B1 | * 2/2001 | Ricks et al. | 324/207.2 |
| 6,297,628 B1 | 10/2001 | Bicking et al. | 324/207.21 |
| 6,362,618 B1 | 3/2002 | Motz | 324/251 |
| 6,373,241 B1 | 4/2002 | Weber et al. | 324/207.2 |
| 6,404,241 B1 | 6/2002 | Ackerman | 327/58 |
| 6,445,171 B2 | 9/2002 | Sandquist et al. | 324/117 |
| 6,472,878 B1 | 10/2002 | Bruchmann | 324/424 |
| 6,539,329 B2 | * 3/2003 | Kato et al. | 702/151 |
| 2003/0231013 A1 | * 12/2003 | Faymon et al. | 324/166 |

* cited by examiner

Primary Examiner—Jay Patidar
(74) Attorney, Agent, or Firm—Kris T. Fredrick; Kermit D. Lopez; Luiz Ortiz

(57) ABSTRACT

Magnetic sensing methods and systems are disclosed. A minimum magnetic signal output and a maximum magnetic signal output can be detected utilizing a sensor comprising a peak detector circuit associated with a filter averaging circuit and one or more magnetic elements (e.g., a Hall element and/or magnetoresistive bridge). An average magnetic signal output can then be determined utilizing the filter averaging circuit when a target begins to rotate in front of the sensor.

20 Claims, 6 Drawing Sheets

US 6,759,843 B2

SENSING METHODS AND SYSTEMS FOR HALL AND/OR MR SENSORS

TECHNICAL FIELD

The present invention is generally related to sensing methods and systems. The present invention is additionally related to sensors utilized in automotive and mechanical applications. The present invention is also related to Hall and magnetoresistive (MR) sensor applications. The present invention is additionally related to position sensing methods and systems thereof.

BACKGROUND OF THE INVENTION

Various sensors are known in the magnetic-effect sensing arts. Examples of common magnetic-effect sensors include Hall effect and magnetoresistive technologies. Such magnetic sensors can generally respond to a change in the magnetic field as influenced by the presence or absence of a ferromagnetic target object of a designed shape passing by the sensory field of the magnetic-effect sensor. The sensor can then provide an electrical output, which can be further modified as necessary by subsequent electronics to yield sensing and control information. The subsequent electronics may be located either onboard or outboard of the sensor package.

Many automotive electronic systems make use of position sensors. When position sensors for automotive electronic systems were originally conceived and developed, such sensors were primarily utilized for the determination of clutch pedal and shift lever positions in automobile transmission applications. Reasonably accurate linear position sensing was required to identify the positions of the clutch pedal and the shift lever, using electrical signals from a non-contacting sensor approach. For example, in automated manual transmission applications, two sensors may be required to sense the shift lever position as it moves in an H-pattern from Reverse to Low to Second to Third gear. For a standard automatic transmission application, where the shift lever moves along a single axis direction, one position sensor may be required to sense whether the shift lever is in one of the gear operating positions (e.g., Reverse, Neutral, Drive, Low, etc.) as well as positions between such operating conditions.

Many of the sensors utilized in automotive applications are configured as position sensors, which provide feedback to a control unit. Many of these types of sensors and related systems are mechanical in nature and are very sensitive to the wearing of contacts, contact contamination, and so forth. To help solve many of the warranty problems associated with mechanical sensors, designers have searched for non-contacting electrical solutions provided by magnetoresistive and/or Hall-effect technologies, which have attempted to detect variance in a magnetic field. One of the primary problems with this approach is the inability of such systems to accurately detect position. The accuracy requirement of such systems makes it difficult, for example, to use a single Hall element because of the offset and shifts over temperature.

The difficulty with both Hall and magnetoresistive technologies is that high accuracy switching points at low and high RPM's are difficult to achieve. Positions sensors must meet high repeatability requirements for both camshaft and crankshaft applications in automotive devices. The present inventor has thus concluded that a need exists for an improved sensing method and system that can provide high accuracy and highly repeatable switch points through a complete RPM range. The present invention is therefore directed toward improved magnetic sensing methods and systems.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor method and system.

It is another aspect of the present invention to provide for a sensing method and system that utilizes a Hall and/or magnetoresistive sensor.

It is yet another aspect of the present invention to provide for a peak detector circuit.

It is still another aspect of the present invention to provide for a filter averaging circuit.

It is also an aspect of the present invention to provide for a camshaft and/or crankshaft position sensor.

The aforementioned aspects of the invention and other objectives and advantages can now be achieved as is now summarized. Magnetic sensing methods and system are disclosed herein. A minimum magnetic signal output and a maximum magnetic signal output can be detected utilizing a sensor comprising a peak detector circuit associated with a filter averaging circuit and one or more magnetic elements (e.g., a Hall element and/or magnetoresistive bridge). An average magnetic signal output can then be determined utilizing the filter averaging circuit when a target begins to rotate in front of the sensor. A minimum magnetic signal output and a maximum magnetic signal output can be detected utilizing a sensor that includes a peak detector circuit, a filter averaging circuit and one or more magnetic elements (e.g., a Hall element and/or magnetoresistive bridge). An average magnetic signal output can then be determined utilizing the filter averaging circuit when a target begins to rotate in front of the sensor.

The filter averaging circuit stabilizes when an area of a curve above the average magnetic signal output is equal to an area under the curve. The sensor can be automatically switched from a peak detector circuit mode to a filter averaging circuit mode at a specified frequency. A sensor switching level can be established approximately halfway between the minimum magnetic signal output and the maximum magnetic signal output. The peak detector can be coupled to one or more biasing magnets. The sensor itself can function as, for example, a camshaft position sensor and/or a crankshaft position sensor.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
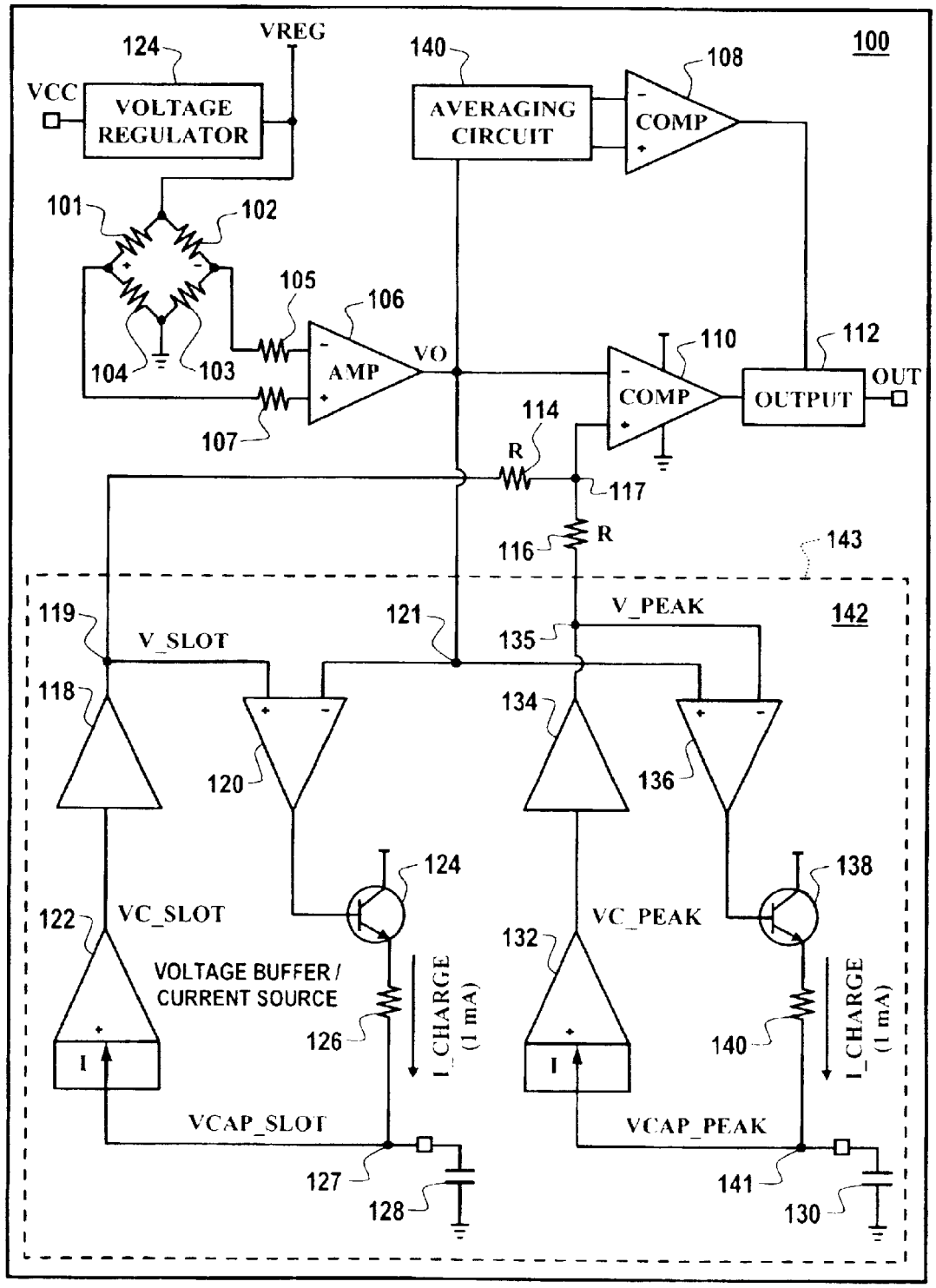
FIG. 1 depicts a schematic diagram of a system for detecting ferromagnetic objects, in accordance with a preferred embodiment of the present invention.

FIG. 1 depicts a schematic diagram of a system 100 for detecting ferromagnetic objects, which can be implemented in accordance with a preferred embodiment of the present invention. System 100 can be implemented as a magnetoresistive (MR) sensor, which includes four MR resistors 101, 102, 103 and 104 that can be integrated into a single IC package. System 100 can be divided into two portions, a peak detector circuit 142 and a filter averaging circuit 140. The peak detector circuit 142 is indicated within the boundaries of dashed line 143. System 100 can therefore be implemented in the context of a sensor for the detection of the motion and position of ferromagnetic and permanent magnet structures by measuring the differential flux density of a magnetic field.

To detect ferromagnetic objects, the magnetic field can be provided by a back biasing permanent magnet, wherein the south pole or north pole of the magnet is attached to a rear unmarked side of the IC package. Signals from MR resistors 101, 102, 103 and 104 can be respectively transferred through resistors 105 and 107 to an amplifier 106 whose output signal can thereafter be transmitted to peak detector circuit 142 and/or filter averaging circuit 140. The output from the filter averaging circuit 140 can be fed to a comparator 108, the output of which is then generally transmitted to an output 112 coupled to the output of a comparator 110. Note that the output from amplifier 106 can also be transmitted as an input signal to a negative input of comparator 110. The output from comparator 110 is thus tied to the output of comparator 108 as indicated by output 112. Two resistors 114 and 116 are can be connected together at a node 117, which is generally connected to a positive input of comparator 110. Resistor 116 is connected between nodes 117 and 135, while resistor 114 is coupled between nodes 117 and 119.

The peak detector circuit 142 generally includes a capacitor 130, which is tied to a resistor 140 and a voltage/buffer current source device 132 at a node 141. The output from the voltage/buffer current source device 132 is provided to an amplifier 134 whose output is connected to node 135. The node 135 can also be coupled to a negative input of an amplifier 136, whose output is connected to a transistor 138. A current I_Charge (e.g., 1 mA) is transferred from transistor 138 to resistor 140, which is further connected to node 141.

Peak detector circuit 142 additionally includes a capacitor 128, which is generally connected to a voltage/buffer current source device 122 and a resistor 126 at a node 127. The output from voltage/buffer current source device 122 can be provided to a comparator 118 whose output is generally coupled to node 119, which in turn is connected to a positive input of an amplifier 120. A negative input of amplifier 120 is connected to node 121. The output from amplifier 120 is connected to a transistor 124, which provides a current I_Charge (e.g., 1 mA) that travels through resistor 126 to node 127.

Offset calculation can be achieved by advanced digital signal processing, or with analog peak detectors as shown in unit 142 and associated elements and processing units. Immediately after power-on, motion can be detected via a start-up mode signal. After a few transitions, the sensor will finish self-calibration and switch to a high-accuracy mode or running mode, as indicated by a running mode signal. In a running mode, switching generally occurs at a signal zero crossing of the arithmetic mean of a maximum value and minimum value of magnetic differential signals thereof.

In other words, a minimum magnetic signal output and a maximum magnetic signal output can be detected utilizing a sensor that includes a peak detector circuit associated with a filter averaging circuit and one or more magnetic elements (e.g., a Hall element and/or magnetoresistive bridge). An average magnetic signal output can then be determined utilizing the filter averaging circuit when a target begins to rotate in front of the sensor.

Figure 2:
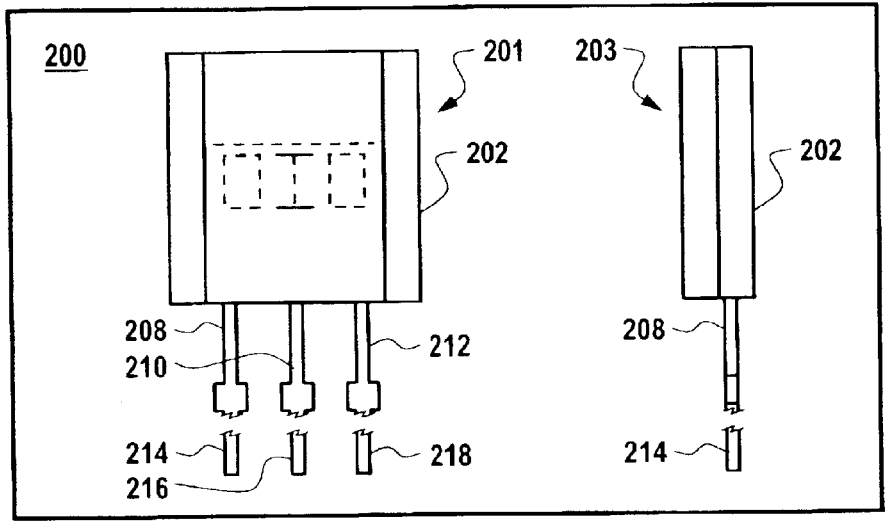
FIG. 2 illustrates a sensor that may be adapted for use with the system illustrated in FIG. 1, in accordance with a preferred embodiment of the present invention.

FIG. 2 illustrates a sensor 200 that may be adapted for use with the system 100 illustrated in FIG. 1, in accordance with a preferred embodiment of the present invention. It is important to note that the circuit illustrated in FIG. 1 can be constructed on a single silicon substrate and this substrate can be mounted on a lead frame flag connected to pin 208, whereas pin 208 generally comprises a ground (i.e., gnd) connection for the circuit defined by system 100. This connection can be made with a conductive epoxy material. The circuit supply voltage is generally connected to pin 212 via a gold wire bond from the circuit to the lead frame. The circuit output and gnd connection can be made in the same manner to pins 210 and 208. The integrated circuit, leadframe and wire bond are thus encapsulated with plastic in the central body 202 as illustrated in FIG. 2. A front view 201 and a side view 203 of sensor 200 are illustrated in FIG. 2. Sensor 200 includes a central body 202 and a plurality of pins 208, 210 and 212, which are respectively associated with pin portions 214, 216 and 218, which respectively are associated with the supply voltage, ground and output connections for the circuit system illustrated in FIG. 1.

Figure 3:
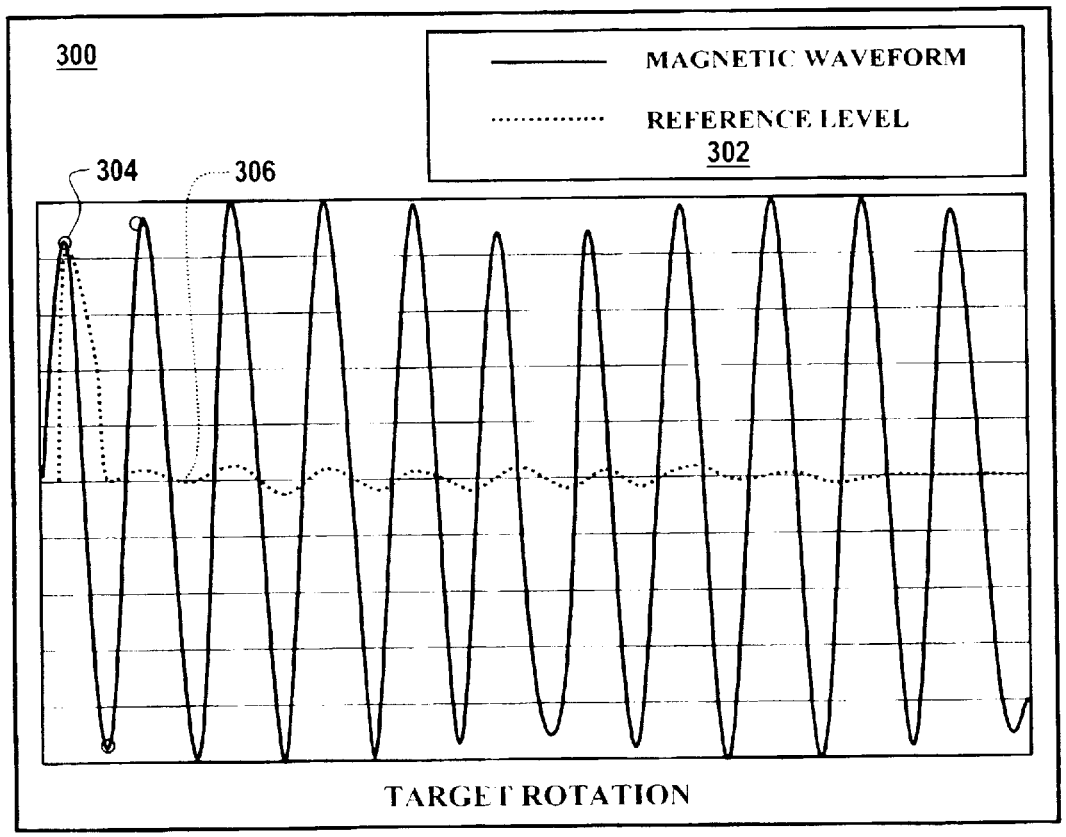
FIG. 3 depicts a graph illustrating a magnetic waveform and a reference level for output switching, in accordance with a preferred embodiment of the present invention.

FIG. 3 depicts a graph 300 illustrating a magnetic waveform and a reference level for output switching, in accordance with a preferred embodiment of the present invention. Graph 300 includes a legend box 302 indicating the magnetic waveform and reference level for output switching lines, which are shown in further detail within graph 300.

The peak detector is indicated at point 304 of graph 300. The point at which the averaging circuit begins to function is indicated at point 306. In FIG. 3, RPM is generally indicated as increasing from left to right on graph 300.

In general, a resulting differential signal can be digitized in an A/D converter and fed into a DSP. A rising or falling transition can then be detected and the output stage triggered accordingly. Because the signal is not offset compensated at this stage, the output does not necessarily switch at zero crossing of the magnetic signal. Signal peaks can also be detected in the digital circuit and their arithmetic mean value can then be calculated. The offset of this mean value can be determined and fed into the offset cancellation DAC. This procedure can be repeated with increasing accuracy. After a few increments, the IC can be switched into a high accuracy running mode.

In a running mode, the comparator can trigger the output. An offset cancellation feedback loop can be formed by the A/D converter, DSP and offset cancellation D/A converter. In the running mode, switching always occurs at zero crossing. It is only affected by the remaining offset (small offset) of the comparator and by the remaining propagation delay time of the signal path, mainly determined by the noise-shaping filter. Nevertheless, signals below a defined threshold are not detected to avoid unwanted parasitic switching.

Figure 4:
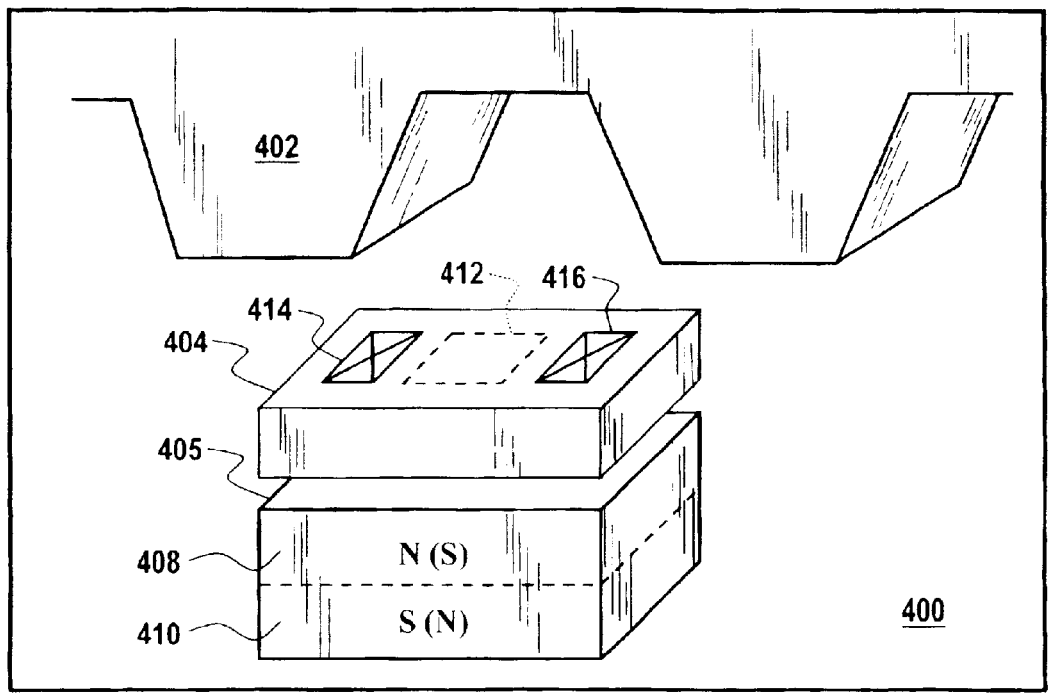
FIG. 4 illustrates a block diagram of a magnetic sensor in association with a permanent magnet and a ferromagnetic tooth wheel, in accordance with a preferred embodiment of the present invention.

FIG. 4 illustrates a block diagram of a system 400 that includes a magnetic sensor 404 in association with a permanent magnet 405 and a ferromagnetic tooth wheel 402, in accordance with a preferred embodiment of the present invention. Magnetic sensor 404 includes a Hall sensor 414 and a Hall sensor 416. Magnetic sensor 404 also includes signal-processing circuitry 412. Signal processing circuitry 412 is generally analogous to signal-processing unit 136 of FIG. 1. Permanent magnet 405 respectively includes North (South) and South (North) portions 408 and 410. Hall sensors 414 and 416 can be configured, for example, as Hall elements 102 and 104 depicted in FIG. 1, or can alternatively, can each be implemented as TLE 4925 Hall elements. Ferromagnetic tooth wheel 402 can form a gear wheel having a plurality of teeth thereof.

Figure 5:
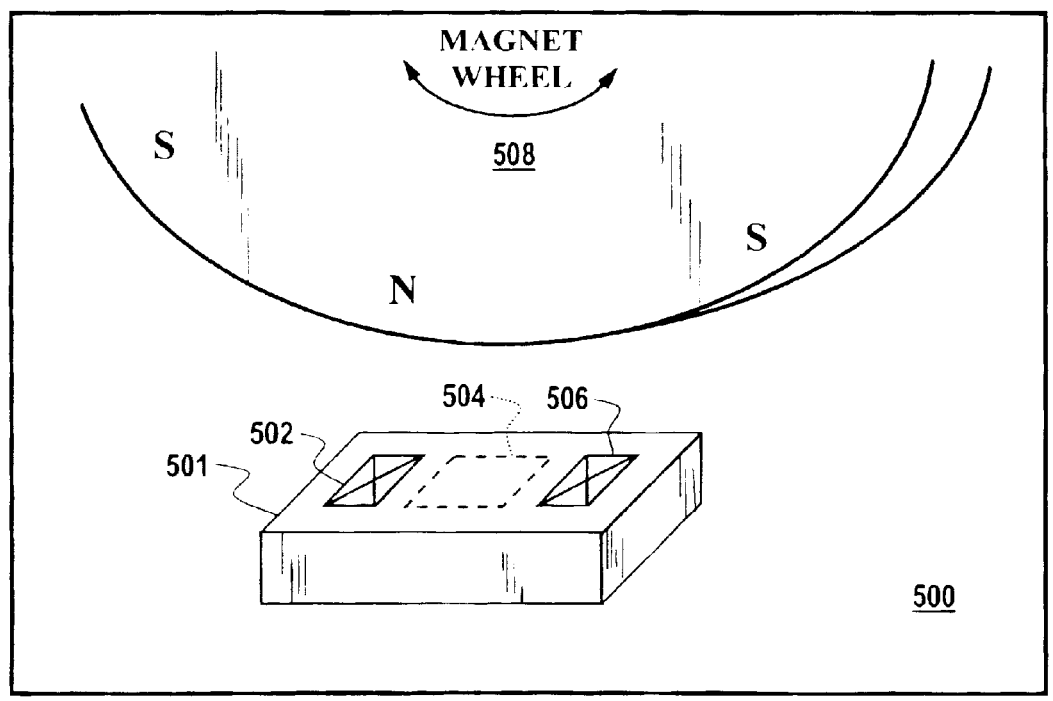
FIG. 5 depicts a block diagram of a magnetic sensor and a magnet wheel, in accordance with a preferred embodiment of the present invention.

FIG. 5 depicts a block diagram of a system 500 that includes a magnetic sensor 501 and a magnet wheel 508, in accordance with a preferred embodiment of the present invention. Magnetic sensor 501 includes Hall sensors 502 and 506, in additional to signal processing circuitry 504. Note that magnetic sensor 501 of FIG. 5 is generally analogous to magnetic sensor 404 of FIG. 4. Similarly, Hall sensors 502 and 506 are generally analogous to Hall sensors 414 and 416 of FIG. 4. Additionally, signal-processing circuitry 412 is analogous to signal processing circuitry 412 of FIG. 4 and signal processing unit 136 of FIG. 1. A single magnetic wheel 508 is indicated in FIG. 5 instead of the ferromagnetic tooth wheel 402 illustrated in FIG. 4.

Figure 6:
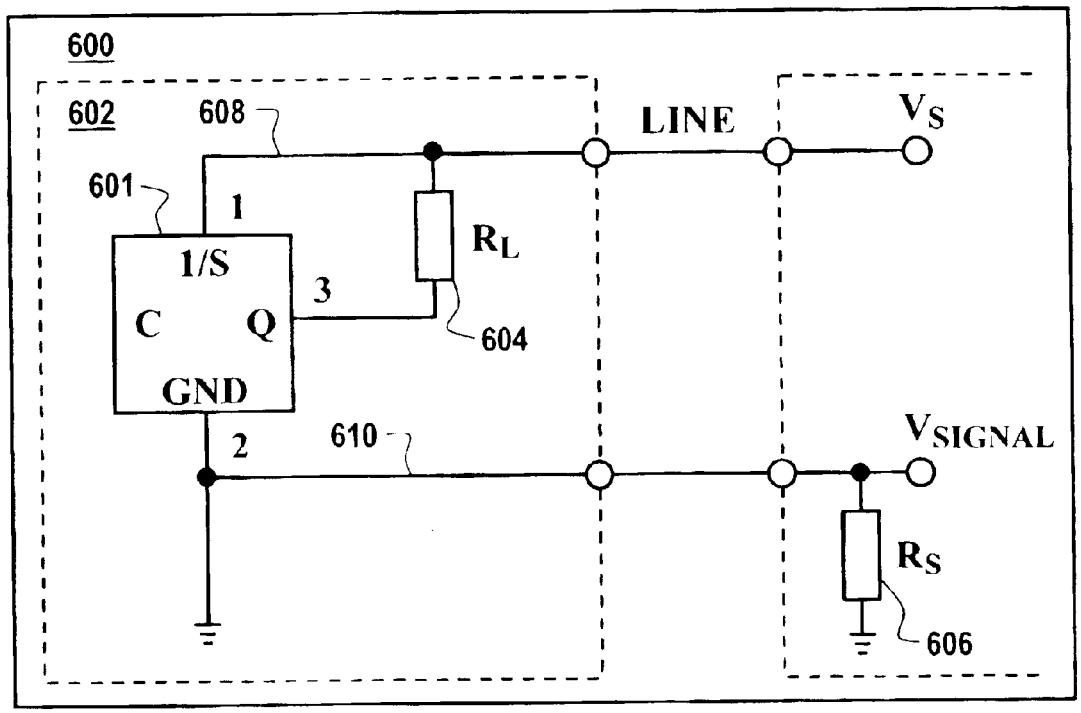
FIG. 6 illustrates a schematic diagram of a magnetic sensor including a two-wire application thereof, in accordance with an alternative embodiment of the present invention.

FIG. 6 illustrates a schematic diagram of a magnetic sensor system 600 including a two-wire application thereof, in accordance with an alternative embodiment of the present invention. A magnetic sensor 602 can include a sensing IC 601 coupled to a voltage $V_s$ via a line 608 at a pin 1 of sensing IC 601. Similarly, a voltage signal $V_{SIGNAL}$ can be generated from a line 610 from pin 2 of sensing IC 601. A resistor 604 (i.e., $R_L$) is generally located between a pin 3 of sensing IC 601 and pin 1. A resistor 606 ($R_S$) can be coupled between pin 2 and ground. In the example illustrated in FIG. 6, resistor 604 can possess a value of approximately 1 kΩ to 2 kΩ, while resistor 606 can possess a value of approximately 120Ω, depending upon a desired implementation. Those skilled in the art can appreciate that such resistor values are essentially a design choice and therefore should not be considered a limiting feature of the present invention.

Figure 7:
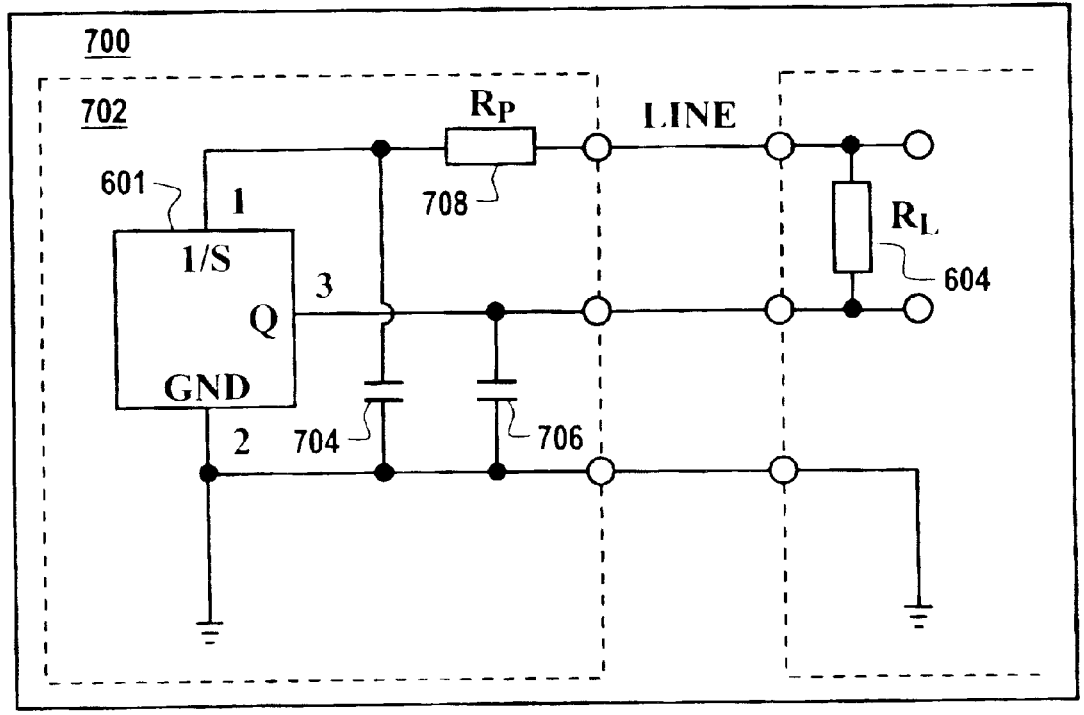
FIG. 7 illustrates a schematic diagram of a magnetic sensor including a three-wire application thereof, in accordance with an alternative embodiment of the present invention.

FIG. 7 illustrates a schematic diagram of a magnetic sensor system 700 including a three-wire application thereof, in accordance with an alternative embodiment of the present invention. Note that in FIGS. 6 and 7, identical or analogous parts are indicated by identical reference numerals. Thus, system 700 includes a magnetic sensor 702 that includes a sensing IC 601, which includes pins 1, 2 and 3 thereof. In the example indicated in FIG. 7, sensing IC 601 can be connected at pin 1 to a resistor 708 (i.e., $R_p$) and a capacitor 704. The capacitor 704 can also be connected to pin 2 of sensing IC 601. A capacitor 706 can be connected between pin 3 and pin 2 of sensing IC 601.

In system 700 of FIG. 7 a voltage signal $V_{SIGNAL}$ can be generated from pin 3 of sensing IC 601. A voltage $V_s$ can be detected at resistor 708, which in turn is connected to resistor 604 (i.e., $V_L$). Resistor 604 is thus coupled between $V_s$ and $V_{SIGNAL}$. Capacitors 704 and 706 can possess values of 4.7 nF, while resistor 708 is generally greater than or equal 200Ω, while resistor 604 can possess a value of 1 to 2 kΩ. Again, resistor and capacitor values are essentially a design choice and not considered a limiting feature of the present invention.

Figure 8:
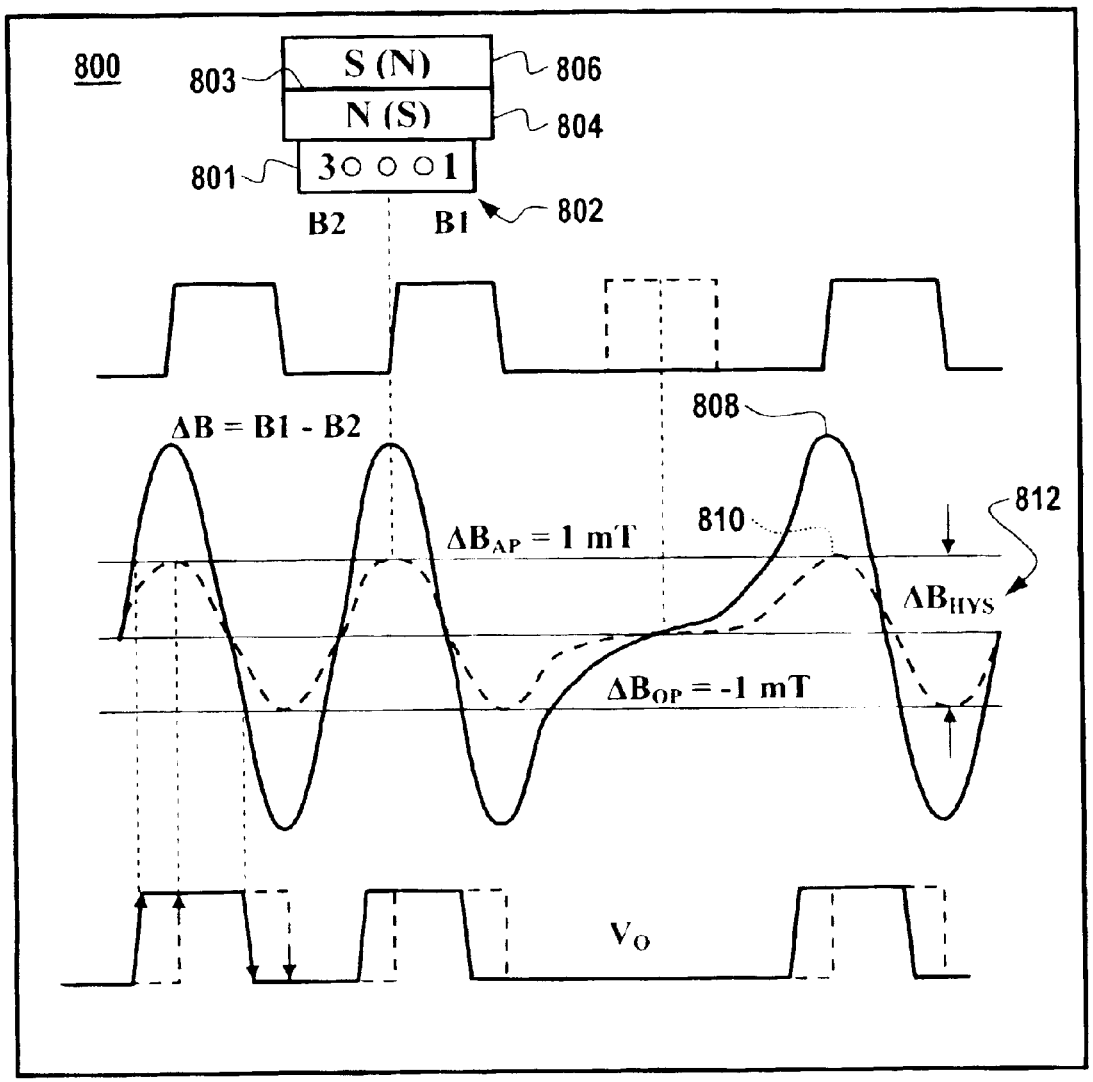
FIG. 8 depicts a graph illustrative of system operations, in accordance with a preferred embodiment of the present invention.

FIG. 8 depicts a graph 800 illustrative of system operations, in accordance with a preferred embodiment of the present invention. As indicated in FIG. 8. a permanent magnet 801 having respective North (South) and South (North) portions 804 and 806 can be associated with a magnetic sensor 801 that includes branded side 802. Magnetic sensor 801 of FIG. 8 is analogous, for example, to magnetic sensor 404 of FIG. 4. Permanent magnet 801 is analogous to permanent magnet 405 of FIG. 4. Magnetic sensor 801 thus includes signal-processing circuitry as described herein. The following parameters are associated with graph 800 of FIG. 8:

Release Point: $B1-B2>\Delta B_{RP}$ switches the output OFF ($V_Q$=HIGH)

Operate Point: $B1-B2<\Delta B_{OP}$ switches the output ON ($V_Q$=LOW)

$\Delta B_{HYS}=|\Delta B_{OP}-\Delta B_{RP}|$

Outside of the permanent magnet 801, the magnetic induction (i.e., flux density) points from the north pole to south pole thereof. It is common to define positive flux if the south pole of permanent magnet 801 is on the branded side 802 of the IC (i.e., magnetic sensor 801). This is essentially equivalent to the north pole of the magnet on the rear side of the IC thereof.

Figure 9:
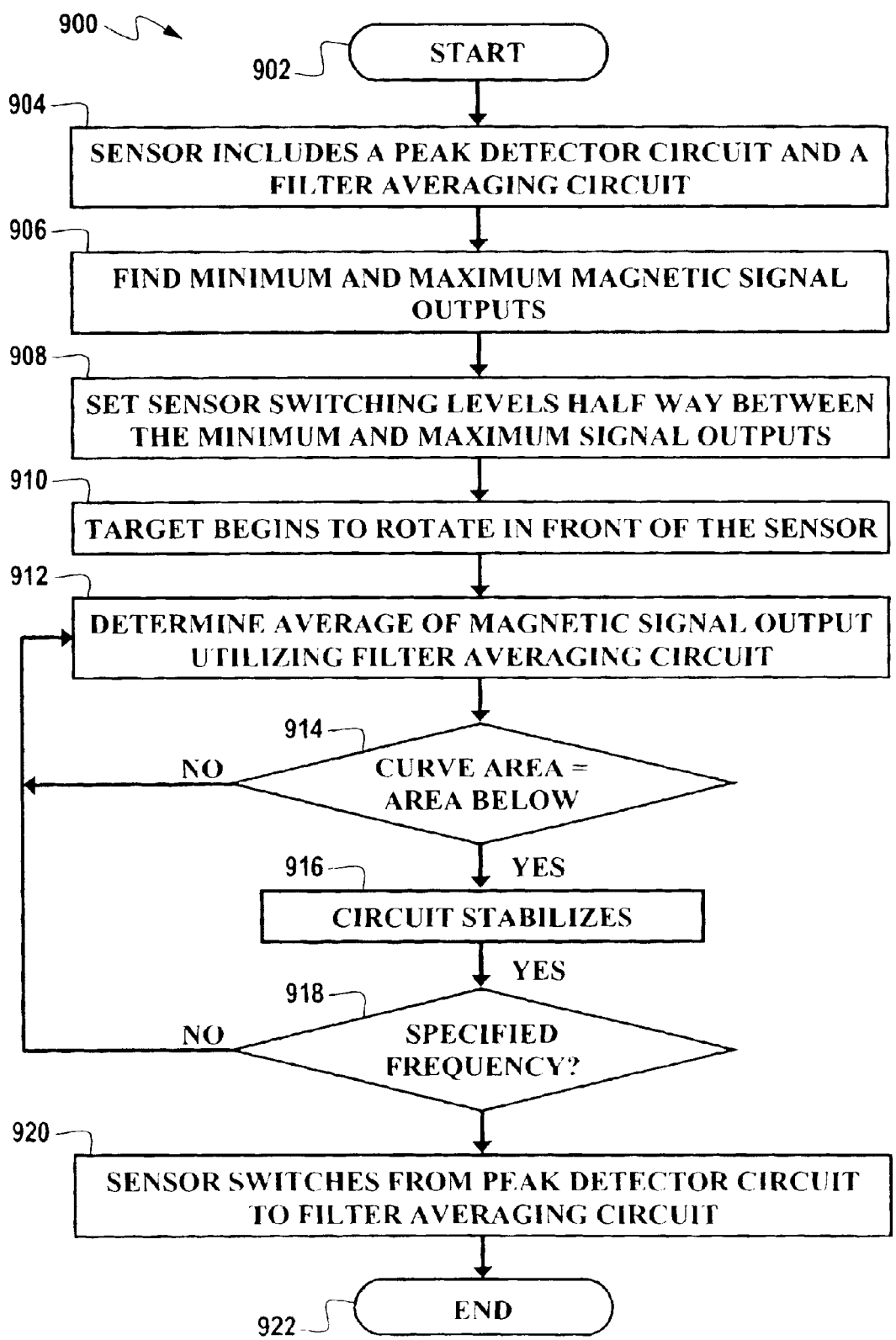
FIG. 9 illustrates a high level flow chart depicting logical operations in accordance with a preferred embodiment of the present invention.

FIG. 9 illustrates a high level flow chart 900 depicting logical operations in accordance with a preferred embodiment of the present invention. The process is initiated as indicated at block 902 and thereafter as illustrated at block 904, a magnetic sensor as disclosed herein can be configured to include both a filter averaging circuit and a peak detector circuit. The peak detector circuit can be implemented as a dual peak detector circuit, which allows the magnetic sensor to possess both a high accuracy switch point at start-up at RPM's. As indicated next at block 906, the peak detector circuit finds the minimum and maximum magnetic signal outputs, as illustrated at block 908, the magnetic sensor switching levels are set halfway between the minimum and maximum magnetic signal outputs.

As described next at block 910, a target can begin to rotate in front of the magnetic sensor. The filter averaging circuit thus begins to determine the average of the magnetic signal output from an MR bridge circuit and/or one or more Hall elements, as indicated at block 912, when the target begins to rotate in front of the sensor. As indicated next at block 914, a test can be performed to determine if the area of the curve (i.e., see FIG. 8) over the average is equal to the area beneath the curve. If the area of the curve over the average is not equal to the area beneath the curve, then the process described at block 912 can be repeated. If, however, the area of the curve over the average is equal to the area beneath the curve, then as illustrated at block 916, the entire circuit stabilizes.

An additional test can then be performed, as depicted at bloc 918 to determine if a specified frequency for switching the peak detector circuit to the filter averaging circuit has been attained. If not, then the processes beginning as indicated at block 912 are repeated. If so, at the specified frequency, the magnetic sensor switches from a peak detector circuit (i.e., a peak detector mode) to the filter averaging circuit (i.e., a filter averaging mode), as indicated at block 920. The process can then terminate, as indicated at block 922.

It can be appreciated by those skilled in the art that the process or method depicted in FIG. 7 may be implemented as a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind The present invention relates to method steps for processing electrical or other (e.g. mechanical, chemical) physical signals to generate other desired physical signals, and can be implemented via a computer or microcomputer. It can be appreciated by those skilled in the art that the methods described herein can be implemented as a program product (e.g., a control program residing in a computer memory) containing instructions that when executed on a CPU, carry out the operations depicted in the logic flow diagrams herein.

While the present invention can be implemented in the context of a fully functional computer system, those skilled in the art will further appreciate that the present invention is capable of being distributed as a program product in a variety of forms, and that the present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. In summary, the process illustrated in FIG. 9 can be implemented as a software computer-program product and/or associated hardware.

Based on the foregoing, it can be appreciated that the present invention discloses position sensing methods and systems. A minimum magnetic signal output and a maximum magnetic signal output can be detected utilizing a sensor comprising a peak detector circuit associated with a filter averaging circuit and one or more magnetic elements (e.g., a Hall element and/or magnetoresistive bridge). An average magnetic signal output can then be determined utilizing the filter averaging circuit when a target begins to rotate in front of the sensor. A minimum magnetic signal output and a maximum magnetic signal output can be detected utilizing a sensor that includes a peak detector circuit associated with a filter averaging circuit and one or more magnetic elements (e.g., a Hall element and/or magnetoresistive bridge). An average magnetic signal output can then be determined utilizing the filter averaging circuit when a target begins to rotate in front of the sensor.

The filter averaging circuit stabilizes when an area of a curve above the average magnetic signal output is equal to an area under the curve. The sensor can be automatically switched from a peak detector circuit mode to a filter averaging circuit mode at a specified frequency. A sensor switching level can be established approximately halfway between the minimum magnetic signal output and the maximum magnetic signal output. The peak detector can be coupled to one or more biasing magnets. The sensor itself can function as, for example, a camshaft position sensor and/or a crankshaft position sensor.

The present invention can be designed and implemented utilizing BICMOS circuitry. The peak detector portion of the overall sensor circuit can be implemented utilizing CMOS technology and the filter/averaging circuit can be implemented via BiPolar circuitry. This integrated circuit, when coupled with a biasing magnet can provide high accuracy and highly repeatable switch points through a complete RPM range of a camshaft and/or crankshaft sensor application.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A magnetic sensing method, said method comprising the steps of:

detecting a minimum magnetic signal output and a maximum magnetic signal output utilizing a sensor comprising a peak detector circuit associated with a filter averaging circuit and at least one magnetic element thereof; and determining an average magnetic signal output utilizing said filter averaging circuit when a target begins to rotate in front of said sensor, wherein said filter averaging circuit stabilizes when an area of a curve above said average magnetic signal output is equal to an area under said curve.

2. The method of claim 1 further comprising the step of:
    automatically switching said sensor from a peak detector circuit mode to a filter averaging circuit mode at a specified frequency.

3. The method of claim 1 further comprising the step of:
    establishing a sensor switching level approximately halfway between said minimum magnetic signal output and said maximum magnetic signal output.

4. The method of claim 1 wherein said at least one magnetic element comprises a Hall element.

5. The method of claim 1 wherein said at least one magnetic element comprises a magnetoresistive bridge.

6. The method of claim 1 further comprising the step of:
    coupling said peak detector circuit with at least one biasing magnet.

7. The method of claim 1 wherein said sensor comprises a camshaft position sensor.

8. The method of claim 1 wherein said sensor comprises a crankshaft position sensor.

9. The method of claim 1 wherein said peak detector circuit comprises BICMOS circuitry.

10. The method of claim 1 wherein said filter averaging circuit comprises BICMOS circuitry.

11. A magnetic sensing system, comprising:

a sensor for detecting a minimum magnetic signal output and a maximum magnetic signal output, wherein said sensor comprises a peak detector circuit associated with a filter averaging circuit and at least one magnetic element thereof; and a filter averaging circuit for determining an average magnetic signal output when a target begins to rotate in front of said sensor, wherein said filter averaging circuit stabilizes when an area of a curve above said average magnetic signal output is equal to an area under said curve.

12. The system of claim 11 further comprising:
    switching mechanism for automatically switching said sensor from a peak detector circuit mode to a filter averaging circuit mode at a specified frequency.

13. The system of claim 11 further comprising the step of:
    a sensor switching level established approximately halfway between said minimum magnetic signal output and said maximum magnetic signal output.

14. The system of claim 11 wherein said at least one magnetic element comprises a Hall element.

15. The system of claim 11 wherein said at least one magnetic element comprises a magnetoresistive bridge.

16. The system of claim 11 further comprising the step of:
    coupling said peak detector circuit with at least one biasing magnet.

17. The system of claim 11 wherein said sensor comprises a camshaft position sensor.

18. The system of claim 11 wherein said sensor comprises a crankshaft position sensor.

19. The system of claim 11 wherein said peak detector circuit comprises BICMOS circuitry and wherein said filter averaging circuit comprises BICMOS circuitry.

20. A magnetic sensing system, comprising:

a sensor for detecting a minimum magnetic signal output and a maximum magnetic signal output, wherein said sensor comprises a peak detector circuit associated with a filter averaging circuit and at least one magnetic element thereof, such that said peak detector circuit comprises BICMOS circuitry and is coupled with at least one biasing magnet thereof;

a filter averaging circuit comprising BICMOS circuitry for determining an average magnetic signal output when a target begins to rotate in front of said sensor, wherein said filter averaging circuit stabilizes when an area of a curve above said average magnetic signal output is equal to an area under said curve; and a switching mechanism for automatically switching said sensor from a peak detector circuit mode to a filter averaging circuit mode at a specified frequency, wherein a sensor switching level is established approximately halfway between said minimum magnetic signal output and said maximum magnetic signal output.

* * * * *